Sept. 13, 1955 A. P. LE PAGE 2,717,408
WINDSHIELD BLADE DE-ICER
Filed Aug. 30, 1954
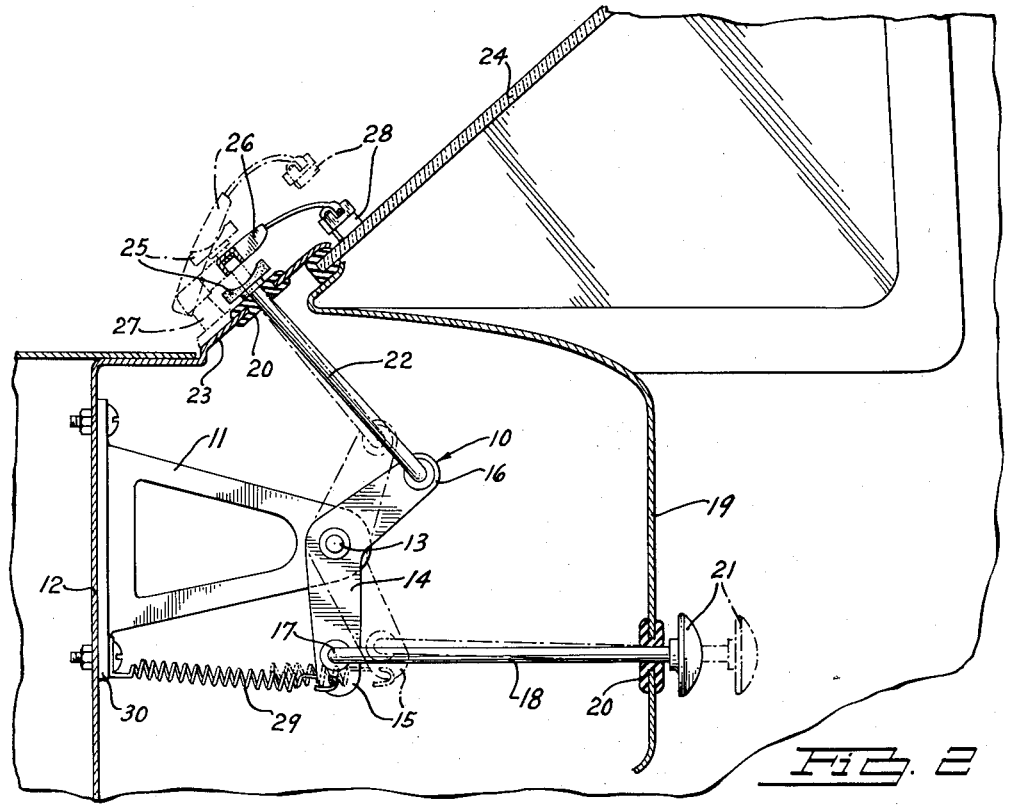
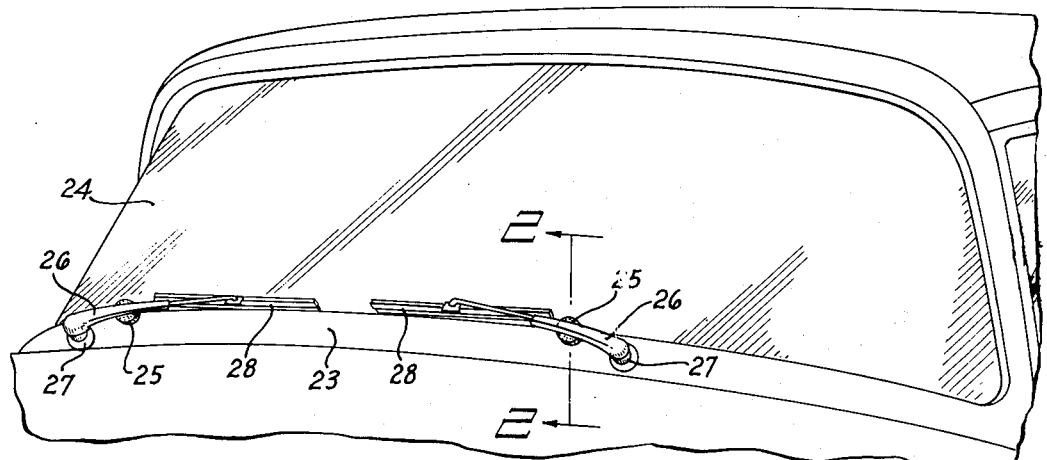
INVENTOR.
ALFRED P. LE PAGE
BY John Joseph Roethel
ATTORNEY

United States Patent Office 2,717,408
Patented Sept. 13, 1955

2,717,408

WINDSHIELD BLADE DE-ICER

Alfred P. Le Page, Detroit, Mich.

Application August 30, 1954, Serial No. 452,816

4 Claims. (Cl. 15—255)

This invention relates to a windshield wiping apparatus and more particularly to a device actuatable from the inside of the vehicle for lifting the windshield wiper blade out of its normal position of contact with the windshield.

In the winter zones motorists oftentimes find their windshields covered with ice, snow or slush. The average motorist will attempt to dislodge such ice, snow or slush by turning on the windshield wiper motor. But frequently because of the weight of the snow or slush or because of the adhesion of the wiper blade to the ice on the windshield, the windshield wiper motor is unable to move the blade. Then it is necessary for the motorist to get out of his vehicle and manually raise the blade out of contact with the windshield so that the blade will be above the snow or slush or free of the ice and will be able to sweep back and forth across the windshield.

Further, it frequently happens that as a motorist is driving through a snowstorm, snow or slush will cake on the wiper blade to such an extent that the blade loses its wiping action. When this occurs it is necessary to stop the vehicle and to leave the shelter thereof in order to manually snap or jar the blade against the windshield to dislodge the caked matter thereon.

It is an object of the present invention to provide a simple and efficient device which is manually actuatable from the inside of the vehicle for lifting the windshield wiper blade out of contact with the windshield glass whereby the wiper blade may be raised above any accumulated slush and snow on the windshield, may be freed from any ice causing it to adhere to the windshield, or may be lifted and dropped to dislodge any slush or snow packed thereon. In its illustrated embodiment the present device comprises a lift pad located so as to be positioned beneath the conventional wiper blade carrying arm when the latter is in its rest position. The lift pad is carried on a plunger movable upwardly by a bell crank swingable by a second plunger adapted to project through the vehicle dashboard. The second plunger carries a knob which may be manually grasped to cause movement thereof. A spring return means is provided to restore the various parts to their at-rest position after the windshield wiper arm has been lifted as desired from the windshield glass by the lift pad.

Other features, objects and advantages of the present invention will be apparent from the following description and appended claims, reference being had to the accompanying drawing forming a part of this specification wherein like reference numerals designate corresponding parts in the several views.

Fig. 1 is a fragmentary perspective view of a portion of an automobile illustrating the location of the lift pads of the present device relative to the conventional windshield wiper arms.

Fig. 2 is a sectional view taken substantially through line 2—2 of Fig. 1.

Before explaining in detail the present invention, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

In the embodiment of the invention illustrated in the drawing, the windshield wiper arm lifting mechanism, generally designated 10, comprises a support bracket 11 adapted to be fastened to the passenger compartment side of the vehicle engine compartment fire wall 12. Pivotedly supported at 13 on the bracket 11 is a bell crank lever 14. As illustrated, the bell crank lever 14 has substantially vertically extending depending arm 15 and an angularly inclined upwardly extending arm 16.

The depending arm 15 is operatively connected at 17 in any convenient manner to the inner end of a substantially horizontally extending plunger or pull rod 18 adapted to extend into the passenger compartment through the vehicle dashboard or panel 19. The rod 18 is journalled for sliding movement in a grommet 20 carried in the dashboard 19 and is provided with a knob 21 on the outer end thereof.

The upwardly extending arm 16 has operatively connected thereto a push rod 22 which is adapted to project through the molding strip 23 conventionally found at the base of the vehicle windshield glass 24. It will be noted that the longitudinal axis of the push rod 22 is substantially at right angles to the plane of the window glass, at least as viewed in Fig. 2. The push rod 22 is slidably journalled in a grommet 20 carried by the molding strip 23. At its outer end the push rod 22 is provided with a lift pad 25 made of any suitable material, such as hard rubber.

As illustrated the lift pad 25 is adapted to underlie the windshield wiper arm 26 when the latter is in its normal rest position. The conventional windshield wiper arm 26, as represented in the drawing is mounted on the usual windshield wiper oscillating shaft 27. The arm 26 is shown with the usual blade 28 attached to its free end. The conventional windshield wiper arm is hingedly mounted on its oscillating shaft and may be pivoted from its normal position parallel to the plane of the glass 24 to a raised position as shown in dotted outline in Fig. 2. A spring means, not shown, is provided to yieldingly urge the arm 26 toward the glass 24 and thereby the blade 28 into engagement with said glass.

It will be noted in Fig. 2 that a tension spring 29 extends between the lower end of the bell crank lever arm 15 and the base 30 of the bracket 11. The spring 29 is adapted to yieldably maintain the parts of the present device in the solid line position shown in Fig. 1.

The operation of the present invention may be briefly summarized. If the vehicle operator desires to raise the windshield wiper blade 28 from the surface of the glass 24 in order to raise the blade above the snow or slush which may have accumulated on the windshield or to free the blade from any ice formation, it is only necessary for him to grasp the knob 21 and to pull the same away from the dashboard 19. Through the motion reversing action of the bell crank lever 14, the push rod 22 will move upwardly and outwardly causing the lift pad 25 to engage the underside of the wiper arm 26 thereby raising the arm 26 and blade 28 to the dotted line position shown in Fig. 2. Upon the knob 21 being released the spring 29 will restore the parts of the lift mechanism 10 to their normal position. The spring tensioning means within the wiper arm 26 will cause the same to be restored to its normal position. The blade 28 having been freed from the ice or relieved of the snow or slush weighing it down may then be oscillated in the normal manner by the wiper motor. It will be readily apparent that a series of repetitive movements of the knob 21 will be translated into a series of corresponding movements of the blade 28. Such repetitive action if done with some rapidity will be effective to jar any slush or snow which may be packed on the blade therefrom.

I claim:

1. A device for lifting a windshield wiper blade out of contact with a windshield glass comprising a base structure adapted to be secured to a vehicle windshield supporting wall, a lever means fulcrumed on said base structure, a manually movable pull rod connected to said lever means, a push rod connected to said lever means, and lift means carried by said push rod positioned to underlie a windshield wiper blade support arm in the rest position of the latter, whereby pulling movement on the pull rod will be translated into pushing movement of the push rod causing said lift means to engage said wiper blade support arm and raise said wiper blade out of contact with said windshield glass.

2. A device for lifting a windshield wiper blade out of contact with a windshield glass comprising a base structure adapted to be secured to a vehicle windshield supporting wall, a lever means fulcrumed on said base structure, a manually movable pull rod connected to said lever means, a push rod connected to said lever means, lift means carried by said push rod positioned to underlie a windshield wiper blade support arm in the rest position of the latter, whereby pulling movement on the pull rod will be translated into pushing movement of the push rod causing said lift means to engage said wiper blade support arm and raise said wiper blade out of contact with said windshield glass, and spring means extending between said lever means and said base structure yieldingly urging said lever means and rods into non-operative position.

3. In combination, a vehicle body structure having a windshield glass, a windshield wiper mechanism including a wiper blade structure oscillatable in the plane of said windshield glass and swingable in a direction normal to said plane, and means manipulatable from the inside of said vehicle body for swinging said wiper blade in said direction, said means comprising a push rod projecting outwardly of said body structure, said push rod carrying at the outer end thereof lift means engageable with said wiper blade structure when the latter is in a position of rest, a bell crank lever pivotally connected to the inner end of said push rod, means swingably mounting said bell crank lever within said body structure, and a pull rod accessible at the interior of said body structure and pivotally connected to said bell crank lever, whereby pulling movement on the pull rod will be translated through the bell crank lever into pushing movement of the push rod causing said lift means to engage said wiper blade structure to swing the same in said direction.

4. In combination, a vehicle body structure having a windshield glass, a windshield wiper mechanism including a wiper blade structure oscillatable in the plane of said windshield glass and swingable in a direction normal to said plane, and means manipulatable from the inside of said vehicle body for swinging said wiper blade in said direction, said means comprising a push rod projecting outwardly of said body structure, said push rod carrying at the outer end thereof lift means engageable with said wiper blade structure when the latter is in a position of rest, a bell crank lever pivotally connected to the inner end of said push rod, means swingably mounting said bell crank lever within said body structure, a pull rod accessible at the interior of said body structure and pivotally connected to said bell crank lever, whereby pulling movement on the pull rod will be translated through the bell crank lever into pushing movement of the push rod causing said lift means to engage said wiper blade structure to swing the same in said direction, and spring means operatively connected to said bell crank lever to yieldingly urge the same and said rods into non-operative position.

References Cited in the file of this patent

UNITED STATES PATENTS

| | | |
|---|---|---|
| 2,306,980 | Roberts | Dec. 29, 1942 |
| 2,337,879 | Folberth et al. | Dec. 28, 1943 |

FOREIGN PATENTS

| | | |
|---|---|---|
| 716,478 | Germany | Jan. 21, 1942 |